United States Patent
Persson

(10) Patent No.: US 8,073,882 B2
(45) Date of Patent: Dec. 6, 2011

(54) METHOD, SYSTEM AND COMPUTER-READABLE MEDIA FOR MANAGING SOFTWARE OBJECT HANDLES IN A DUAL THREADED ENVIRONMENT

(76) Inventor: Mats Stefan Persson, Los Gatos, CA (US)

( * ) Notice: Subject to any disclaimer, the term of this patent is extended or adjusted under 35 U.S.C. 154(b) by 952 days.

(21) Appl. No.: 11/827,375

(22) Filed: Jul. 11, 2007

(65) Prior Publication Data

US 2009/0019079 A1 Jan. 15, 2009

(51) Int. Cl.
*G06F 17/30* (2006.01)
*G06F 17/00* (2006.01)

(52) U.S. Cl. .................. 707/813; 707/999.206

(58) Field of Classification Search .......... 706/47; 707/999.103, 705, 825, 609, 813, 999.206; 717/108, 116; 719/312, 319
See application file for complete search history.

(56) References Cited

U.S. PATENT DOCUMENTS

| | | | |
|---|---|---|---|
| 5,598,562 A * | 1/1997 | Cutler et al. ............ | 718/104 |
| 6,081,665 A | 6/2000 | Nilsen et al. | |
| 6,295,640 B1 | 9/2001 | Eidt | |
| 6,393,439 B1 | 5/2002 | Houldsworth et al. | |
| 6,453,466 B1 | 9/2002 | Eidt | |
| 6,473,777 B1 | 10/2002 | Hendler et al. | |
| 6,571,252 B1 * | 5/2003 | Mukherjee ................ | 1/1 |
| 6,584,478 B1 | 6/2003 | Spertus | |
| 6,684,392 B2 | 1/2004 | Eidt | |
| 6,795,836 B2 | 9/2004 | Arnold et al. | |
| 6,883,172 B1 | 4/2005 | Angeline et al. | |
| 7,013,469 B2 | 3/2006 | Smith et al. | |
| 7,017,162 B2 | 3/2006 | Smith et al. | |
| 7,024,436 B2 | 4/2006 | Kolodner et al. | |
| 7,069,279 B1 | 6/2006 | Rau et al. | |
| 7,191,441 B2 | 3/2007 | Abbott et al. | |
| 7,299,320 B2 * | 11/2007 | Nace et al. ................ | 719/312 |
| 2002/0055929 A1 | 5/2002 | Kolodner et al. | |
| 2002/0055941 A1 | 5/2002 | Kolodner et al. | |
| 2002/0056019 A1 | 5/2002 | Kolodner et al. | |
| 2002/0107879 A1 | 8/2002 | Arnold et al. | |
| 2002/0138819 A1 | 9/2002 | Hills | |
| 2002/0166116 A1 | 11/2002 | Eidt | |
| 2002/0194421 A1 | 12/2002 | Berry et al. | |
| 2003/0005027 A1 | 1/2003 | Borman et al. | |
| 2003/0196061 A1 | 10/2003 | Kawahara et al. | |
| 2004/0230911 A1 | 11/2004 | Bent et al. | |
| 2004/0237064 A1 | 11/2004 | Liu et al. | |
| 2005/0138640 A1 | 6/2005 | Fresko | |
| 2005/0188349 A1 | 8/2005 | Bent et al. | |
| 2005/0188350 A1 | 8/2005 | Bent et al. | |
| 2005/0240943 A1 | 10/2005 | Smith et al. | |

(Continued)

*Primary Examiner* — Marc Filipczyk
(74) *Attorney, Agent, or Firm* — Patrick Reilly

(57) ABSTRACT

A method and computer-readable media for managing software object handles in a dual threaded or multi-threaded environment are provided. In a first version a software driven computational process drives a first thread, while a garbage collector process drives a second active computational thread within a host computer. The software driven computational process generates persistent software objects that are temporarily stored in a memory of the host. Each handle may include an object identifier of the handle itself, an open/closed flag and a pointer to a unique persistent object. The open/closed flag indicates whether the persistent object associated with a handle shall remain open and accessible for processing or may be selected for closure by the garbage collector process. A plurality of handle wrappers are each associated in a one-to-one correspondence with a unique handle. Each handle wrapper is a software data structure that may include a in-use/not in-use flag and a specific handle or a pointer to a handle.

15 Claims, 11 Drawing Sheets

U.S. PATENT DOCUMENTS

| | | |
|---|---|---|
| 2005/0246716 A1 | 11/2005 | Smith et al. |
| 2005/0262181 A1 | 11/2005 | Schmidt et al. |
| 2005/0262493 A1 | 11/2005 | Schmidt et al. |
| 2006/0156152 A1 | 7/2006 | Trowbridge et al. |
| 2006/0225107 A1 | 10/2006 | Seetharaman et al. |
| 2006/0259528 A1 | 11/2006 | Dussud et al. |
| 2007/0011415 A1 | 1/2007 | Kaakani et al. |
| 2007/0011660 A1 | 1/2007 | Garyali et al. |
| 2007/0067770 A1* | 3/2007 | Thomasson ............ 718/100 |
| 2007/0101435 A1* | 5/2007 | Konanka et al. ............ 726/27 |

* cited by examiner

METHOD, SYSTEM AND COMPUTER-READABLE MEDIA FOR MANAGING SOFTWARE OBJECT HANDLES IN A DUAL THREADED ENVIRONMENT

FIELD OF THE INVENTION

The present invention relates to information technology systems that maintain databases and enable processing and editing information contained within the database. The present invention more particularly relates to enabling the processing of data of a database by a computational device.

BACKGROUND OF THE INVENTION

Numerous conventional electronic information technology systems maintain information in an electronic or optical storage memory, such as an optical disk, and then retrieve selected data structures from the storage memory and into an operational memory of a computational device for processing and/or modification. After a data structure has been retrieved and processed or modified, the data structure may be read back into the storage memory. The format of the data structure may be altered when read or processed by the computational device. The format of the data structure may also be altered when written back into the storage memory from the computational device.

In some computers running object oriented data base management systems ("OODBMS"), software objects may be retrieved from a storage memory, read into a cache memory of the computer and reformatted for processing by the computer. After processing, these software objects may be reformatted to conform with a preferred format of the storage memory, and then written back into the storage memory. The objects read back into the storage memory may be modified and/or contain new information as a result of the processing performed by the computer. In this way object databases and the information recorded therein may be updated, expanded and more effectively managed.

The OODBMS may simultaneously manage multiple threads of information processes. Some of these threads may be directed to process the same objects. For example, the OODBMS may initiate a first process that generates persistent objects stored within a cache memory of a host computer of the OODBMS. In addition, a garbage collector function may be directed by the OODBMS to close certain persistent objects stored in the cache memory that are no longer being referenced by the first process. One primary purpose of the garbage collector may be free up storage space of the cache memory by closing persistent objects that are not of immediate interest to the OODBMS. The garbage collector will thereby initiate a finalizer function, wherein selected persistent objects are first reformatted for storage, then written into a storage memory, and the memory space temporarily dedicated to store these persistent objects is made available for storing other information.

The prior art therefore creates a dilemma in that the garbage collector may be running according to a one thread and attempting to close persistent objects of a process of another thread. This lack of synchronicity of the garbage collector and other processes of the OODBMS inhibits the efficiency of the garbage collector in determining (1.) which persistent objects of the cache memory may be written into the storage memory, and (2.) when storage locations of the cache memory assigned to store a temporary persistent object may be made available for other uses.

There is therefore a long felt need to increase the efficiency of an OODBMS by providing a system and technique for more effectively determining when memory locations storing one or more temporary persistent objects shall be made available for other uses.

It is understood that certain prior art OODBMS's will read an entire page or other grouping of software objects in to a cache memory of a host computer for the purpose of making one or more software objects of the read page or grouping available for information processing.

Garbage collection is the automatic reclamation of computer storage. Paul R. Wilson, "Uniprocessor Garbage Collection Techniques", 1992, available on the Web at ftp.cs.utexas.edu/pub/garbage/gcsummary.ps, and Bill Venners, "Garbage Collection", Chapter 9 of Inside the Java Virtual Machine, on the Web at www.artima.com/insidejvm/ed2/gcP.html, both of which are incorporated by reference herein, both of which provide excellent surveys of different garbage collection techniques, the individual aspects of which are beyond the scope of this disclosure.

The prior art includes efforts to improved object-oriented database management efficiency. U.S. Pat. No. 7,191,441 discloses a method and apparatus for suspending a software virtual machine; U.S. Pat. No. 7,069,279 presents a timely finalization of system resources; U.S. Pat. No. 7,024,436 teaches of a computer system with two heaps in contiguous storage; U.S. Pat. No. 7,017,162 discloses an application program interface for network software platform; U.S. Pat. No. 7,013,469 discusses an application program interface for network software platform; U.S. Pat. No. 6,883,172 discloses a system and method for bridging managed and unmanaged object systems; by utilizing an interface wrapper to facilitate transparent communications; U.S. Pat. No. 6,795,836 teaches of a method for accurately determining an object's lifetime; U.S. Pat. No. 6,684,392 presents a method and apparatus for distinguishing reference values from non-reference values in a runtime environment; U.S. Pat. No. 6,584,478 discloses a transparent garbage collection of resources; U.S. Pat. No. 6,473,777 discusses a method for accelerating java virtual machine byte code verification, just-in-time compilation and garbage collection by using a dedicated co-processor; U.S. Pat. No. 6,453,466 presents a method and apparatus for distinguishing reference values from non-reference values in a runtime environment; U.S. Pat. No. 6,393,439 teaches of a stored data object marking for garbage collectors; U.S. Pat. No. 6,295,640 discloses a method and apparatus for distinguishing reference values from non-reference values in a runtime environment; and U.S. Pat. No. 6,081,665 presents a method for efficient soft real-time execution of portable byte code computer programs.

More recent prior art includes additional efforts to improved object-oriented database management efficiency. United States Patent Application Publication No. 20070011660 discloses a deterministic runtime execution environment and method; United States Patent Application Publication No. 20070011415 presents an apparatus and method for deterministic garbage collection of a heap memory; United States Patent Application Publication No. 20060259528 discusses an implementation for collecting unmanaged memory; United States Patent Application Publication No. 20060225107 teaches of a system for running applications in a resource-constrained set-top box environment; and United States Patent Application Publication No. 20060156152 discloses critical finalizers.

The entire disclosures of each and every patent and patent application mentioned in this present disclosure, are incorporated herein by reference, in their entirety, and for all purposes. The patents incorporated herein by reference in their entirety and for all purposes include, but are not limited to, U.S. Pat. Nos. 7,191,441; 7,069,279; 7,024,436; 7,017,162; 7,013,469; 6,883,172; 6,795,836; 6,684,392; 6,584,478; 6,473,777; 6,453,466; 6,393,439; 6,295,640; and 6,081,665. The patents applications incorporated herein by reference in their entirety and for all purposes include, but are not limited to, United States Patent Application Publication No.'s 20070011660; 20070011415; 20060259528; 20060225107; and 20060156152.

SUMMARY OF THE INVENTION

Towards the object of improving the efficiency of information processing, and other objects that will be made obvious in light of this disclosure, a first version of the method of the present invention (hereafter "first method") provides a method and media for managing software object handles in a dual threaded environment. Certain alternate preferred embodiments of the method of the present invention provide a method, system or computer-readable medium for managing software object handles in a dual threaded or multi-threaded environment.

In the first method a first software driven computational process drives a first thread, and is instantiated by a host information technology system, while a garbage collector process drives a second active computational thread instantiated by the same information technology system. The first software driven computational process of the ("first process") generates persistent software objects that are temporarily stored in a memory of the information technology system. Individual software handle structures ("handles") are temporarily associated with specific persistent objects of the first process. Each handle includes an object identifier of the handle itself, an open/closed flag and a pointer to a unique persistent object. The open/closed flag indicates whether the persistent object associated with a handle shall remain open and accessible for processing or may be selected for closure by the garbage collector process ("garbage collector"). The handle pointer may include both a page pointer to a page temporarily stored in a cache memory, and a ponter to the location of a particular object stored within the referenced page. A handle is associated with an object when the handle includes a pointer to the associated object.

In the first method a plurality of handle wrappers are each associated in a one-to-one correspondence with a unique handle. Each handle wrapper is a software data structure that includes a in-use/not in-use flag and a pointer to a specific handle. A handle wrapper is associated with a handle when the handle wrapper includes a pointer to the associated handle. A handle wrapper may be associated with a particular object when the handle wrapper (a.) comprises a handle that references an object identifier or a pointer to an object; and/or (b.) includes a pointer to a specific handle, and that specific handle in turn includes a pointer to, or an object identifier of, that particular object.

In the first method the garbage collector may periodically or occasionally read the handle wrappers to determine whether any in-use handle wrapper flags are in the not in-use state. The garbage collector may, upon detection of an unreferenced object, direct or enable a finalizer process of the information technology system to change the in-use/not in-use flag of a handle wrapper associated with the unreferenced object to indicate a state of not in-use.

The computer may, after setting the in-use flag/not in-use flag to indicate not in-use of a handle wrapper, close the persistent object associated with the handle wrapper. The process of closing a persistent object stored in a cache memory of the may include (1.) reformatting a software object to conform with the data base format of a storage memory, (2.) writing the reformatted object from the cache memory to the storage memory and thereby updating information of a data base of the storage memory, and (3.) informing the information technology system that the cache memory location(s) storing the persistent object may be released for overwriting and other uses.

The first method thereby enables a garbage collector and an object finalizer to examine and delete persistent objects of the first process while the garbage collector and the finalizer comprise one or more threads distinct from the thread comprising the first process.

Certain still alternate preferred embodiments of the method of the present invention comprise a computational system that enables a garbage collector and an object finalizer to examine and delete persistent objects of the first process while the garbage collector and the finalizer drives one or more threads other than the thread of the first process.

Certain yet alternate preferred embodiments of the method of the present invention comprise a computer-readable medium presenting machine readable instructions that enable or direct a computational system to employ a garbage collector and an object finalizer to examine and delete persistent objects of the first process while the garbage collector and the finalizer drive one or more threads other than the thread of the first process The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
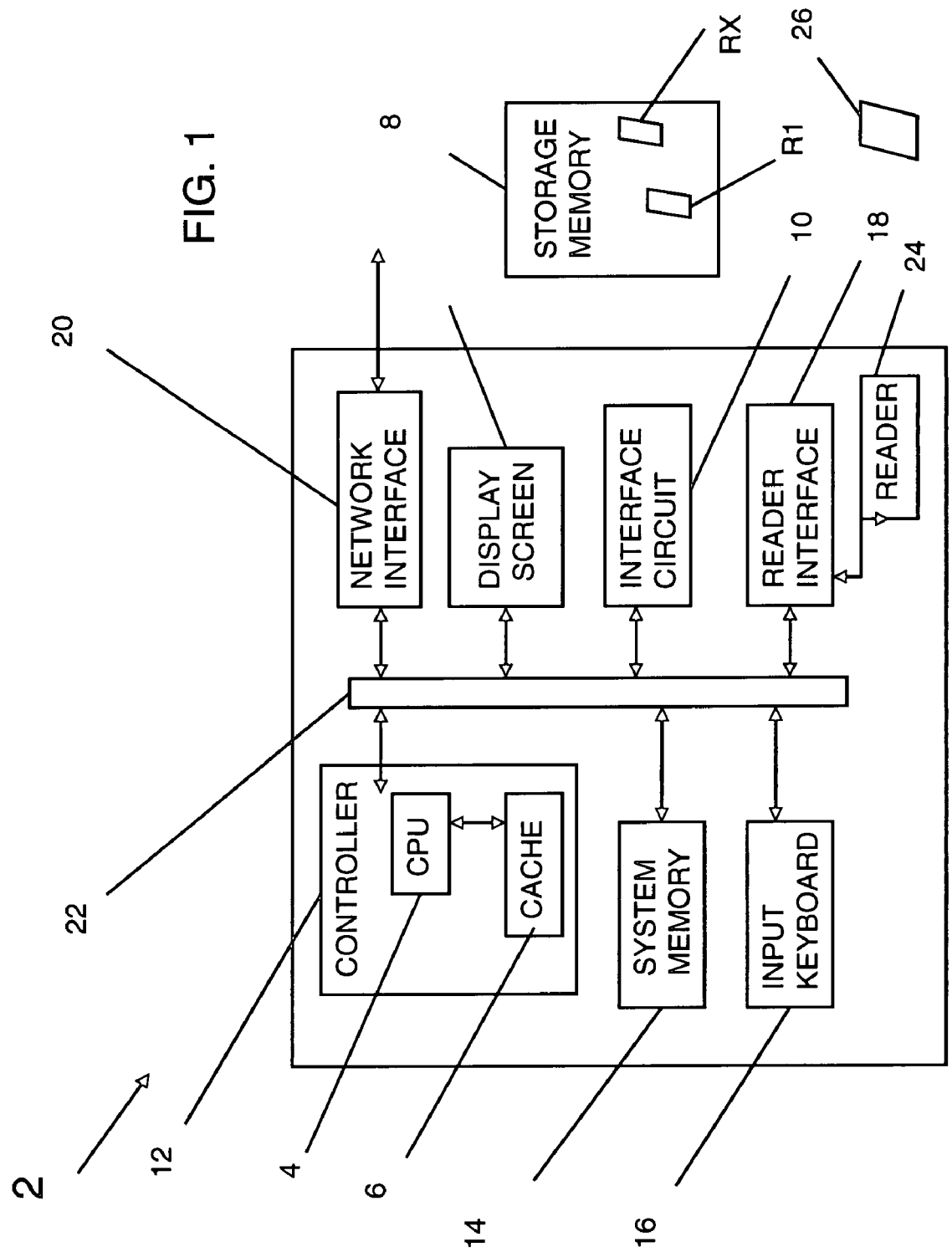
FIG. 1 illustrates a prior art computer having a central processing unit, a cache memory, a memory storage device and an interface circuit disposed between the central processing unit and the memory storage device.

Referring now generally to the Figures and particularly to FIG. 1, FIG. 1 illustrates a prior art computer 2 having a central processing unit 4 (hereafter "CPU" 4), a cache memory 6, a memory storage device 8 and an interface circuit 10 between the CPU 4 and the memory storage device 8. The interface circuit 10 is configured to retrieve information from and write information onto the memory storage device 8. The memory storage device 8 may be a magnetic disk peripheral or an optical disk peripheral.

The computer 2 may be or comprise (1.) a SOLARIS SPARCSERVER computer workstation marketed by Sun Microsystems of Santa Clara, Calif. running LINUX™ or UNIX™ operating system; (2.) a personal computer configured for running WINDOWS XP™ operating system marketed by Microsoft Corporation of Redmond, Wash. (3.) a VAIO FS8900 (™) notebook computer marketed by Sony Corporation of America, of New York City, N.Y.; or a (4.) POWERBOOK G4 (™) personal computer marketed by Apple Computer, Inc., of Cupertino, Calif.

In operation, the CPU 4 will fetch software objects O1-OX in singularity, or fetch groupings of software objects O1-OX, e.g., pages of software records R1-RX, from the memory storage device and store the fetched information in the cache memory 6. The information stored in the cache memory 6 may be modified or updated as a result of a process performed by the computer 4 and then written back into the memory storage device 8. The software records R1-RX stored in the memory storage device 8 may thereby be updated.

It is understood that while a record R1-RX is being processed by the computer 2 that the record R1-RX might not be made available to other computers 2 in order to insure that the record R1-RX as stored in the memory storage device 8 is fully updated before another process is performed on the basis of the record R1-RX.

The capacity of the cache memory 6 is finite. Information read into the cache memory 6 causes the memory capacity storing the information to be made unavailable for other uses. Freeing up memory locations of the cache memory 6 can increase the effectiveness and efficiency of the computer 2.

The CPU 4 and the cache memory 6 are comprised within a controller 12. The controller 12 is bi-directionally communicatively coupled with interface circuit 10, a system memory 14, a digital input keyboard 16, a media reader interface 18, a network interface 20 by means of an internal communications bus 22.

The system memory 14 may be used by the controller 12 to store information in the execution of the method of the present invention. The network interface 20 may be bi-directionally communicatively coupled with an electronics communications network (not shown), e.g., the Internet, an intranet, and extranet or other suitable electronics communications networks.

The media reader interface 18 communicatively couples a media writer/reader 24 with the CPU 4 and the system memory 14 by means of the internal communications bus 22. The media writer/reader 22 is configured to read a computer-readable 26 and machine executable instructions stored within the computer-readable medium 26 and transmit the read instructions to the computer 2, e.g., the CPU 4 and the system memory 14. The machine executable instructions stored within the computer-readable medium 26 and transmitted to the computer 2 may direct the computer 2 to support, enable, execute and/or instantiate one or all of the aspects of the method of the present invention, to include one or more aspects of the first method and/or the second method.

The terms "computer-readable medium" and "computer-readable media" as used herein refer to any suitable medium known in the art that participates in providing instructions to the network and/or the computer. Such a medium may take many forms, including but not limited to, non-volatile media, volatile media, and transmission media. Non-volatile media includes, for example, optical or magnetic disks, such as may be comprised within the system memory.

Volatile media includes dynamic memory. Transmission media includes coaxial cables, copper wire and fiber optics. Transmission media can also take the form of acoustic or light waves, such as those generated during radio wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer system can read.

Various forms of computer-readable media 26 may be involved in carrying one or more sequences of one or more instructions to the network for execution. For example, the instructions may initially be carried on a magnetic disk of a remote server. The remote server can load the instructions into its dynamic memory and send the instructions over a telephone line using a modem. A modem local to or communicatively linked with the network can receive the data on the telephone line and use an infra-red transmitter to convert the data to an infrared signal. An infrared detector can receive the data carried in the infrared signal and appropriate circuitry can provide the data to the network.

Figure 2:
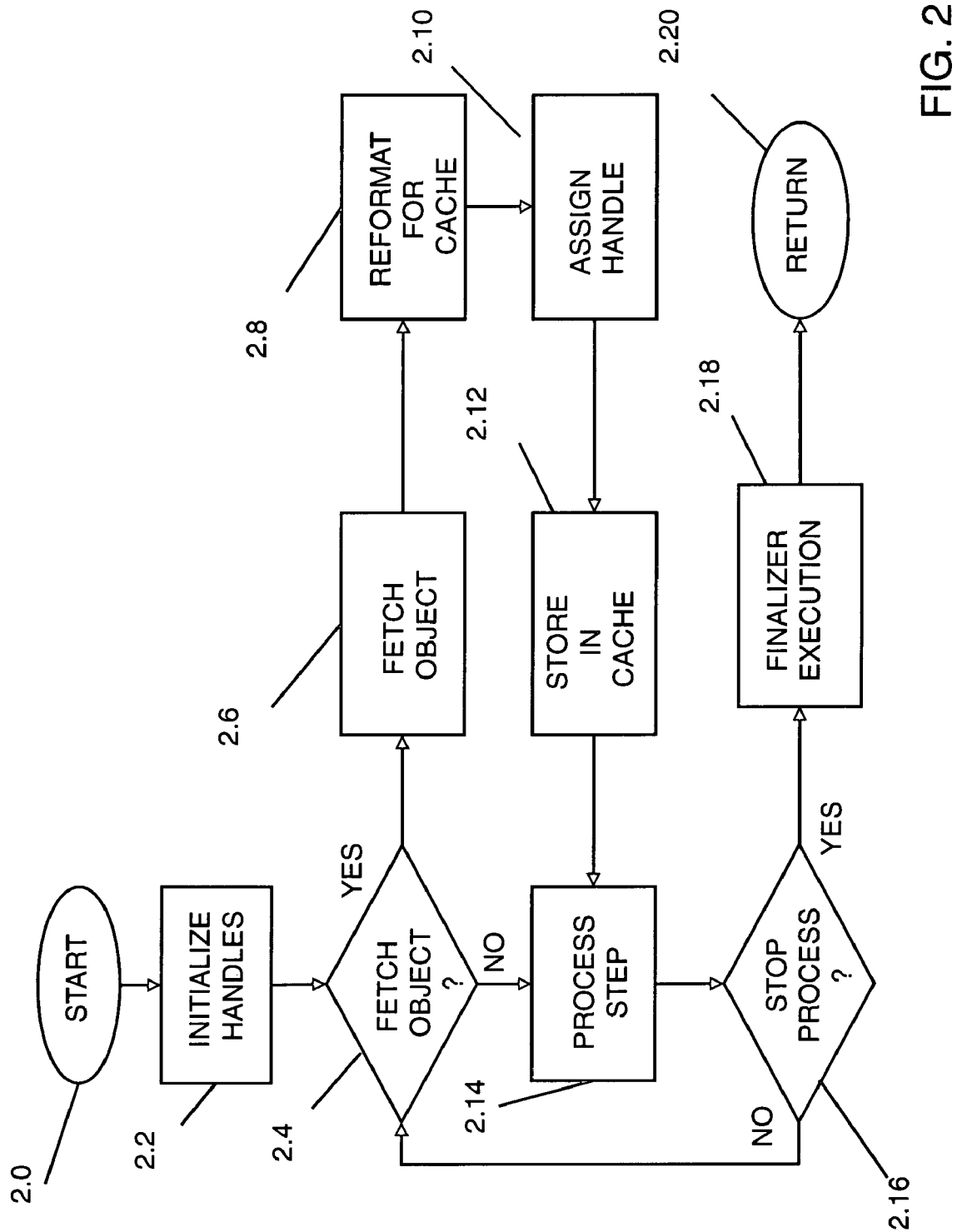
FIG. 2 presents a prior art technique for operating the computer of FIG. 1 by accessing information from the memory storage device, storing the accessed information in the cache memory, processing the accessed memory, and then writing the accessed information back into the memory storage device.

Referring now generally to the Figures and particularly to FIG. 2, FIG. 2 presents a prior art technique for accessing information from the memory storage device 8, storing the accessed information in the cache memory 6, processing the accessed information, and then writing the accessed information back into the memory storage device 8. The writing back of the information after processing by the computer 2 results in updating the information as stored in the memory storage device 8.

An information technology process running along a first thread is initiated in step 2.0. In step 2.2 a plurality of software handles H1-HX (hereafter "handles" H1-HX) are initialized. In step 2.4 the computer 2 determines whether the active information processing thread of step 2.0 requires that an object O1-OX of a record R1-RX shall be fetched from the storage memory 8 or from a remote location via the network interface 20. In step 2.6 an object O1-OX is read from a record R1-RX, or optionally a page of objects containing a requested object O1-OX is read from a record R1-RX and into the cache memory 6, or optionally the system memory 14. In step 2.8 the object O1-OX or page of objects O1-OX read into the computer 2 in step 2.6 is reformatted for processing by the controller 12. On step 2.10 a handle H1-HX is assigned to the object O1-OX of step 2.6, and in step 2.12 the reformatted object O1-OX and the assigned handle H1-HX is stored in the cache memory 6.

In step 2.14 an information processing step of the first thread of step 2.0 is performed on the reformatted object O1-OX of step 2.8. In step 2.16 the computer 2 determines whether the information technology process initiated in step 2.0 shall be ended, and if the computer 2 determines in step 2.26 to end the process initiated in step 2.0, the computer proceeds on to initiate execution of a finalizer process in step 2.18, and therefrom to return to alternate operations in step 2.20.

Figure 3:
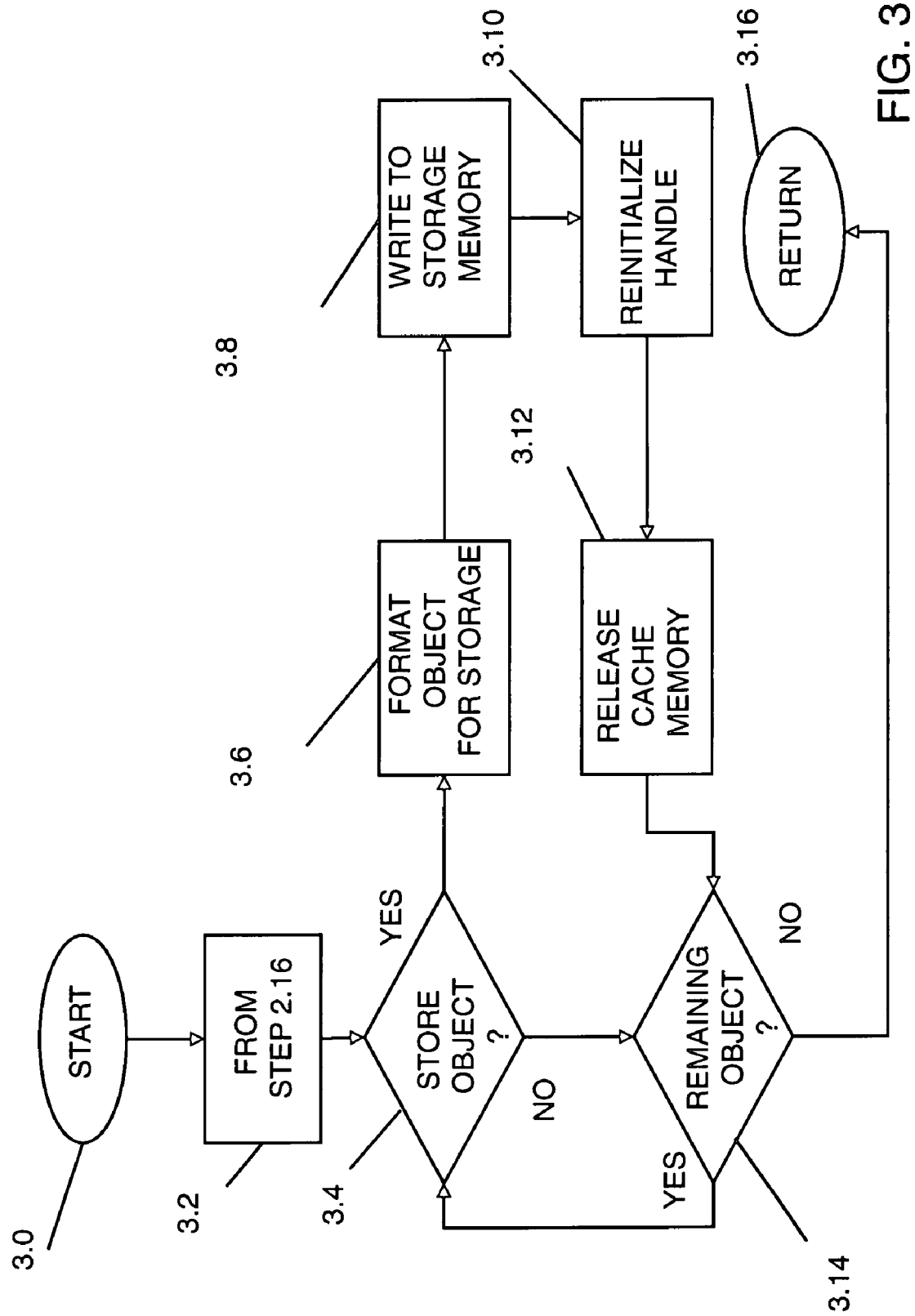
FIG. 3 presents a prior art technique of using a garbage collection in the operation of the computer to expedite the writing of information back to the memory storage device and freeing up memory locations of the cache memory.

Referring now generally to the Figures and particularly to FIG. 3, FIG. 3 presents a prior art technique of using a garbage collection process to expedite the writing of information back to the memory storage device 8 and freeing up memory locations of the cache memory 6. The garbage collection process is driven along a second thread distinguished from the second thread of the process of FIG. 2. The prior art fails to permit the garbage collection process to task a finalizer process to transfer information from cache memory 6, and thereby free up cache memory space for other uses, until the first process has included.

The computer 2 may proceed from step 2.16 to step 3.4, wherein the computer 2 initiates the finalizer process and determines whether the reformatted object O1-OX stored in the cache memory 6 and processed in step 2.14 shall be written back into a record R1-RX of the storage memory 8, or additionally or alternatively, written into an electronics communications network via the network interface 20. In step 3.6 the computer 2 reformats the object O1-OX fetched in step 2.6 back into a storage format, and in step 3.8 the object O1-OX is written back into a record R1-RX of the storage memory 8, or additionally or alternatively, written into an electronics communications network via the network interface 20. In step 3.10 the handle H1-HX assigned to the instant object O1-OX in step 2.10 is reinitialized and made available for reassignment to another object O1-OX stored in cache memory 6. In step 3.12 locations of the cache memory 8 dedicated to storing the object O1-OX during the process steps intervening between step 2.12 and step 3.12 are released and made available to store other information or objects O1-OX. In step 3.14 the computer 2 determines whether all objects O1-OX written into the cache memory 8 in the execution of the first thread have been examined in step 3.4. If all objects O1-OX stored in the cache memory 8 in the process of execution of the first thread, the computer 2 proceeds on from step 3:14 and to step 3.16 and return therefrom to alternate information processing.

In contrast with the prior art, the method of the present invention enables the computer to more promptly free up memory space in the cache memory by enabling the cache memory to write certain software objects O1-OX back into the storage memory prior to the completion of the process for which the software objects O1-OX were read from the storage memory.

Figure 4:
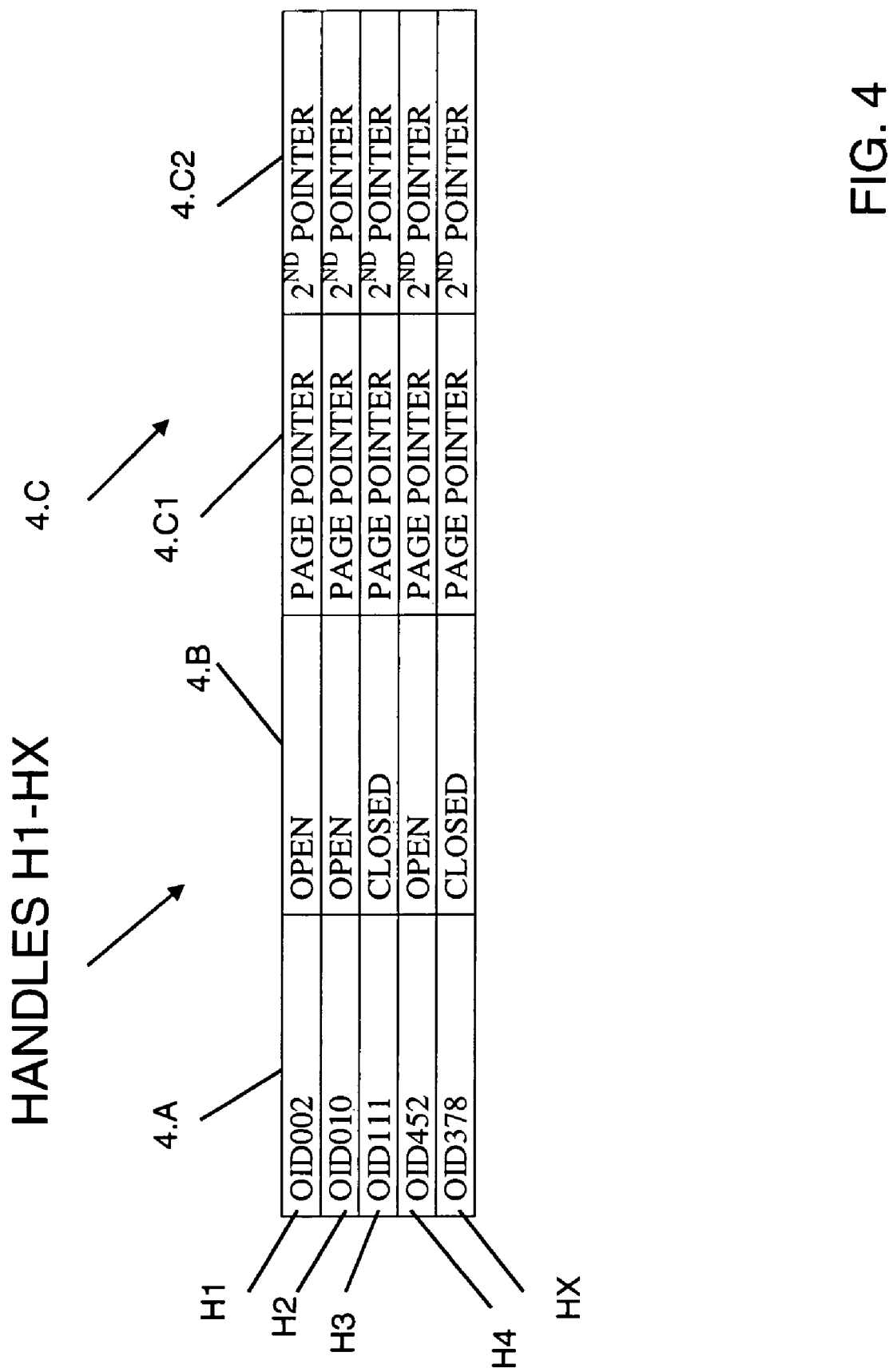
FIG. 4 is a schematic of a plurality of software handles, wherein each handle may be associated with a software object stored within the cache memory of the computer of FIG. 1.

Referring now generally to the Figures and particularly to FIG. 4, FIG. 4 is a schematic of a plurality of software handles H1-HX. Each software handle H1-HX includes an object identifier 4.A to which the handle H1-HX is assigned, an open/closed flag 4.B, and an object pointer 4.C to the location in the cache memory 6 at which the software object O1-OX to which the handle H1-HX is assigned is stored. It is understood that the object pointer 4.C may include (1.) a page pointer 4.C1 to a location in cache memory where a page in which the relevant software object O1-OX is stored; and (2.) a second pointer 4.C2 to a location within a page wherein the software object O1-OX is stored.

Handles H1-HX are used for (1.) closing objects O1-OX, that is changing the bits of a handle H1-HX to a disk or other storage or archival format; (2.) opening objects O1-OX; and (3.) for finding objects O1-OX in the cache memory 6 when referenced from other objects O1-OX. Each user session maintains a list of its open handles. When a session is ended transaction, all open handles are closed. A problem with all this occurs when the owner of a handle H1-HX is a garbage collectible object O1-OX as in a C# binding. The garbage collector runs in the second thread, different than the first thread of a user database session initiated by the information technology process of step 2.0. The prior art can not close the handle H1-HX from the garbage collector running along the second thread, because the handle closing code of the prior art garbage collector requires a handle H1-HX to be run within the same thread as the thread of the process that generated the object O1-OX in cache memory 6, e.g., the first thread of the information technology process of step 2.0.

Figure 5:
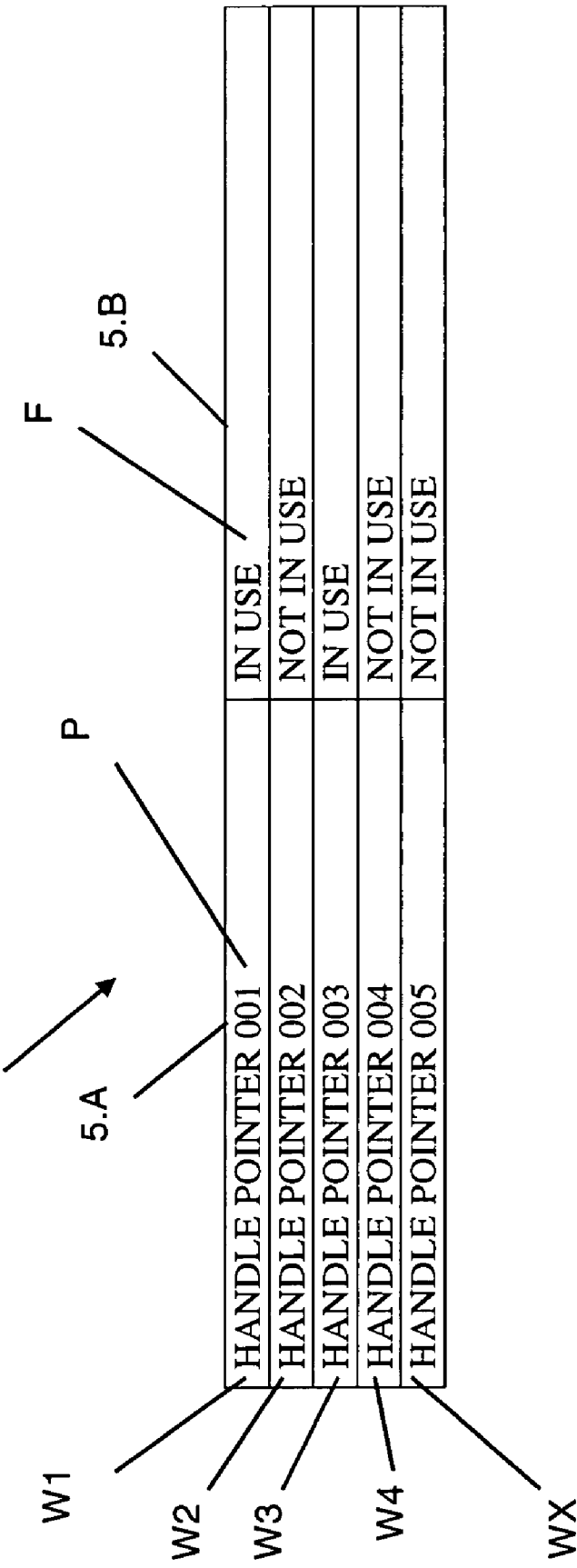
FIG. 5 is a schematic of a plurality of software handle wrappers that are each uniquely associated with a handle of FIG. 4 in a one-to-one correspondence.

Referring now generally to the Figures and particularly to FIG. 5, FIG. 5 is a schematic of a plurality of software handle wrappers W1-WX. Each handle wrapper W1-WX includes an in-use/not in-use flag F and a handle pointer P to a location within the cache memory 8 wherein a handle H1-HX associated with the handle wrapper W1-WX containing the pointer to the instant handle H1-HX is stored. The plurality of handles H1-HX and handle wrappers W1-WX are associated in unique one-to-one correspondences.

According to the first method of the present invention, the computer 2 maintains both a list of handle wrappers W1-WX and the plurality of handles H1-HX in the cache memory 6. Each handle wrapper W1-WX has a handle pointer data field 5.A and an in-use flag data field 5.B. The computer 2 assigns each handle wrapper W1-WX to an individual object handle H1-HX by writing a pointer P to a specific handle H1-HX in the handle pointer data field 5.A. When a software driven process, e.g. the process initiated in step 2.0, requests a new object instantiation in the cache memory 6, the computer 2 links the new object O1-OX with an available handle H1-HX selected by the computer 2 as being pointed to, or associated with, one the handle wrappers W1-WX having an in-use flag F in the in-use data field 5.B that is set to "not in use". According to the first method, when the instant object O1-OX becomes unreferenced by the process of step 2.0, the garbage collector second thread operates to call the object finalizer. The finalizer then sets the in-use flag F back to "not-in-use". A negative, NULL or ZERO value of the in-use flag F may indicate that the handle H1-HX pointed to by a handle wrapper W1-WX is not in use and therefore is available for overwrite or assignment to an object, and positive or a ONE value of the in-use flag F may indicate that the handle H1-HX pointed to by a handle wrapper W1-WX is in use and therefore is not presently available for overwrite or assignment to an object O1-OX.

Figure 6:
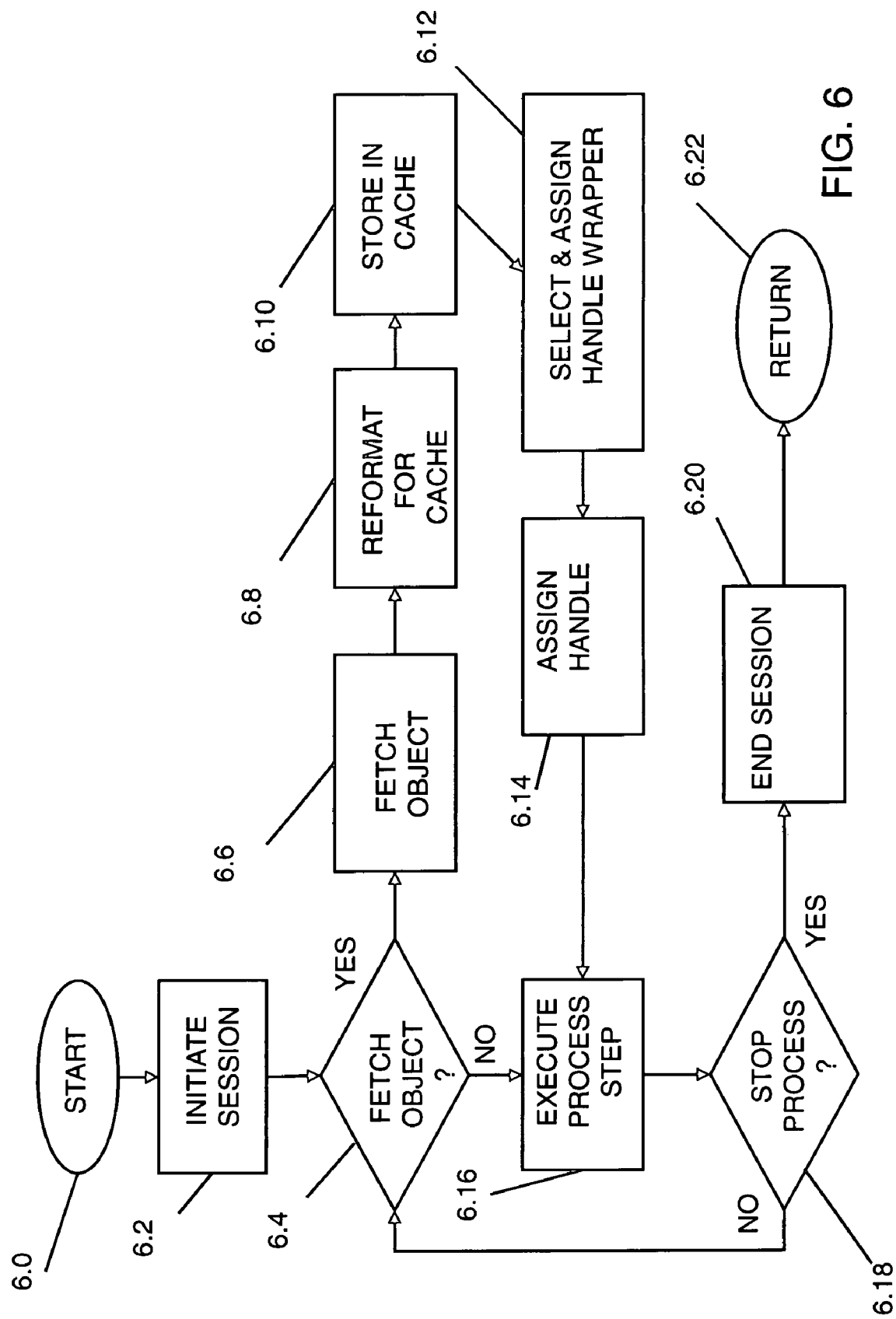
FIG. 6 is a flowchart illustrating the operation of the first method as executed by the computer of FIG. 1.

Referring now generally to the Figures and particularly to FIG. 6, FIG. 6 is a flowchart illustrating the operation of the first method as executed by the computer 2 of FIG. 1. A first process drives a first thread and a garbage collector process comprises a second thread. The first and second threads are simultaneously managed by the computer 2.

Referring now to the first process, a plurality of handles H1-HX and associated handle wrappers W1-WX are initialized prior to the generation of persistent objects O1-OX. As the first process proceeds, pages of data comprising software objects O1-OX are read from the storage memory 8 and into the cache memory 6. In step 6.6 an object, and optionally a page of software objects O1-OX, is read from the storage memory 8 by the CPU 4. In step 6.8 the object O1-OX selected in step 6.6 is reformatted for storage in the cache memory 6. The reformatted object O1-OX of step 6.8 is then stored in the cache memory 6 in step 6.10. A handle wrapper WIO-WX with a handle wrapper flag F set to "not in-use" is selected and the handle wrapper flag F is reset to "in-use" in step 6.12. In step 6.14 the handle H1-HX pointed to by the handle wrapper W1-WX selected in step 6.12 is assigned to the individual persistent object O1-OX of the cache memory 6 stored in step 6.10, and the open/closed flag 4.B of the assigned handle H1-HX is set to open. As per FIG. 4, each assigned handle H1-HX includes (1.) an object identifier 4.A (hereafter "OID" 4.A) of the assigned persistent object, (2.) an open/closed flag 4.B, and (3.) a pointer identifying the location of the object O1-OX identified in the OID field of the same handle 4.C. The open/closed flag 4.B indicates whether the handle H1-HX comprising the instant open/closed flag shall be maintained by the computer 2 for the purposes of completing the process comprising the first thread, and whether the persistent object O1-OX identified by the OID 4.A of the comprising handle H1-HX shall be maintained in the cache memory 6 for the purposes of completing the process comprising the first thread and then updating the identified persistent object O1-OX as the persistent object O1-OX is stored in the storage memory 8. When the handle flag 4.B is changed to closed, the comprising handle H1-HX may be reassigned to another persistent object, the last assigned persistent object O1-OX may be written back into storage memory 8 to update the storage memory 8, and the memory locations dedicated to maintaining the persistent object O1-OX in cache memory 6 may be made available to store other information or other purposes.

A software object O1-OX stored in the cache memory 6 may be written back into the storage memory 8, and erased from the cache memory 6, when that software object O1-OX is unreferenced by the any active application or thread. It is understood that a persistent object O1-OX may be stored within the cache memory 6 as an element of a page of software objects O1-OX or other grouping of information, and that the entire page or grouping of information might not be written back into the storage memory 8 until all elements of a same page or grouping are no longer required to be maintained in the cache memory 6.

In the prior art, the garbage collector forms a different and second thread than the first thread of the process of step 2.0. The garbage collector therefore can not examine the handles H1-HX to determine which persistent objects O1-OX shall be written back into the storage memory 8 until after the first process of step 2.0 has been completed. The cache memory 6 therefore is burdened with dedicating memory locations to maintaining information no longer of interest to any active process or thread longer than required. The efficiency of the computer 2 in managing the cache memory 6 is thereby degraded.

According to the method of the present invention, and to address the limitations of the prior art, each handle wrapper W1-WX is assigned by the computer 2 in a unique, one-to-one correspondence to an individual handle H1-HX, wherein each handle wrapper W1-WX includes an in-use/not in-use flag F and a pointer P to a specific and uniquely assigned handle H1-HX.

Figure 7:
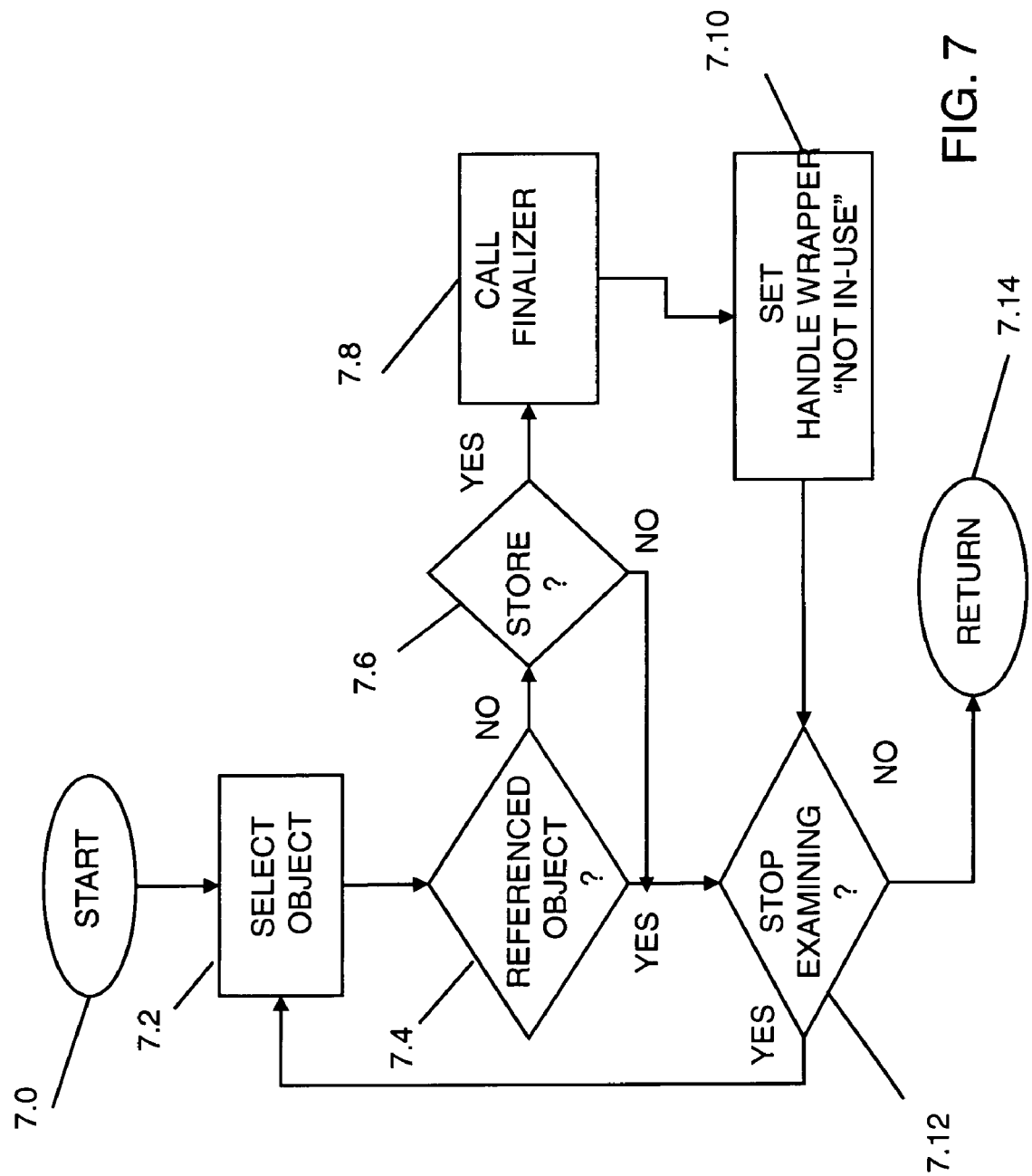
FIG. 7 illustrates the garbage collector operating in accordance with the first method of FIG. 6.

Referring now generally to the Figures and particularly to FIG. 7, FIG. 7 illustrates the garbage collector operating in accordance with the first method, the first method being an alternate preferred embodiment of the method of the present invention. The garbage collector examines the objects O1-OX stored in the cache memory 6 and selects objects O1-OX that are not referenced by any active process of the computer in step 7.4.

In step 7.6, the computer determines whether an unreferenced object O1-OX selected in step 7.4 shall be written back into the storage memory to update the storage memory. In step 7.8 the finalizer process is initiated. In step 7.10 the "in-use" flag F of the handle wrapper W1-WX associated with the handle H1-HX pointing to the object O1-OX selected in step 7.6 is set to "not in-use". In step 7.12 the computer 2 determines whether the to continue process of steps 7.2-7.10 by returning to step 7.2, or to cease examining objects O1-OX stored in the cache memory 6 and proceed onto other operations as per step 7.14.

In the prior art, Java binding fails to link garbage collectible persistent objects O1-OX with object handles H1-HX. In certain other alternate preferred embodiments of the method of the present invention, object identifiers may be used instead of object handles H1-HX, however the application of object identifiers may require the use of look ups of information in cache memory that are less than optimally efficient.

Figure 8:
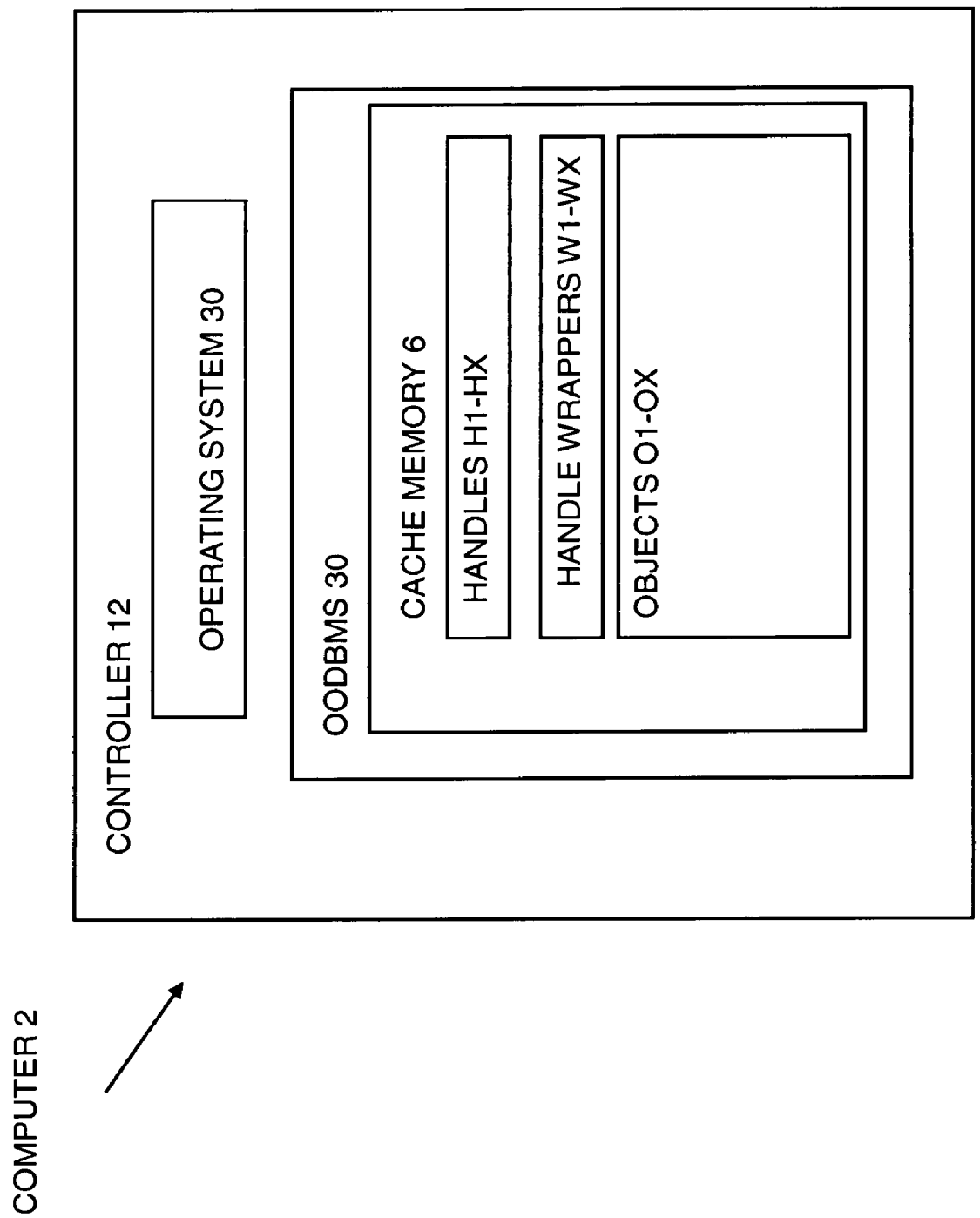
FIG. 8 is an illustration of aspects of the computer of FIG. 1, to include an OODBMS and an operating system.

Referring now generally to the Figures and particularly to FIG. 8, FIG. 8 is an illustration of certain aspects of the computer 2. The controller 12 includes an operating system 28 and an OODBMS 30. The OODBMS 30 directs at least part of the cache memory to store, maintain and update the handles H1-HX, handle wrappers W1-WX, and objects O1-OX. The OODBMS 30 and/or the operating system 28 includes software code that enables the computer 2 to instantiate or execute the process of step 2.0, the garbage collection process, and the finalizer process. The OODBMS 30 and/or the operating system 28 further includes software code that enables the computer 2 to execute one or more of the aspects or steps of the present invention.

The OODBMS 30 may be or comprise (1.) an object oriented database as marketed by Objectivity, Inc., of Sunnyvale, Calif.; (2.) an IBM DB2 Universal Database (™) server (in Linux, UNIX (™)) marketed by IBM Corporation of Armonk, N.Y.; and/or (3.) WINDOWS™ operating system environments marketed by Microsoft Corporation of Redmond, Wash.

Figure 9:
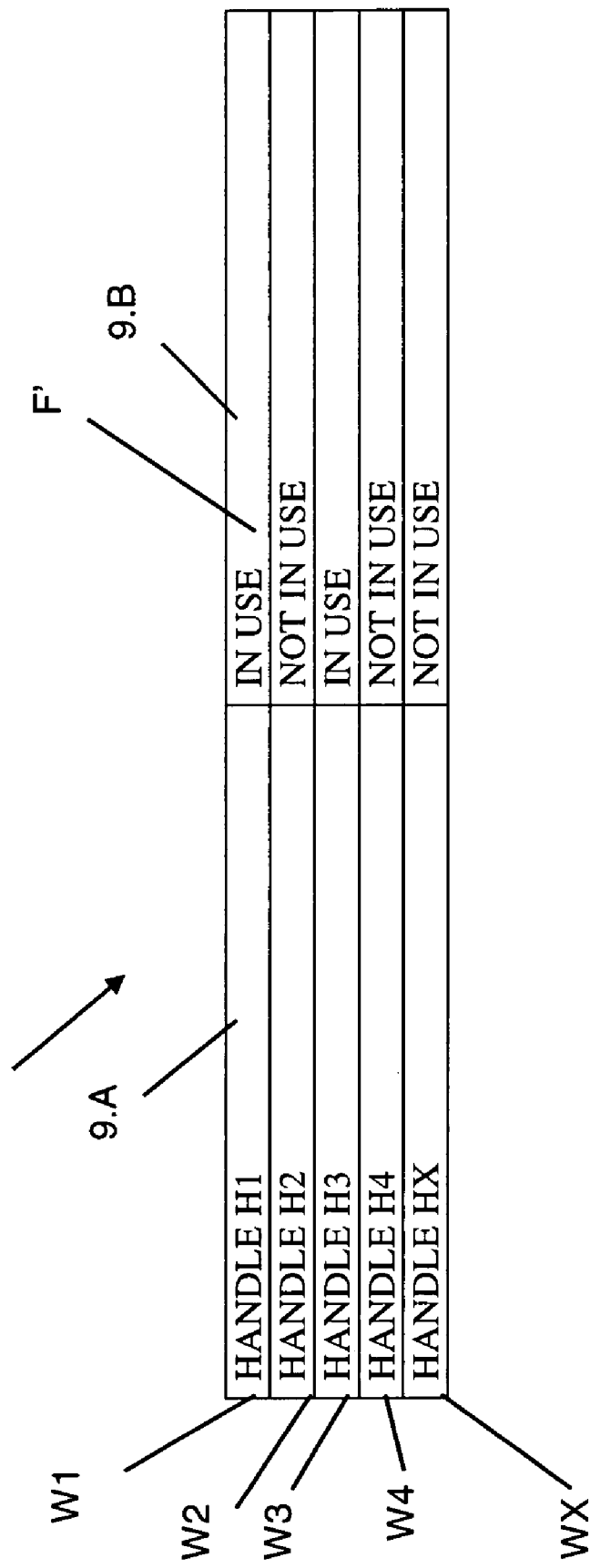
FIG. 9 is a schematic of a plurality of alternate handle wrappers that are implemented in accordance with a second alternate preferred embodiment of the method of the present invention, or second method.
Figure 10:
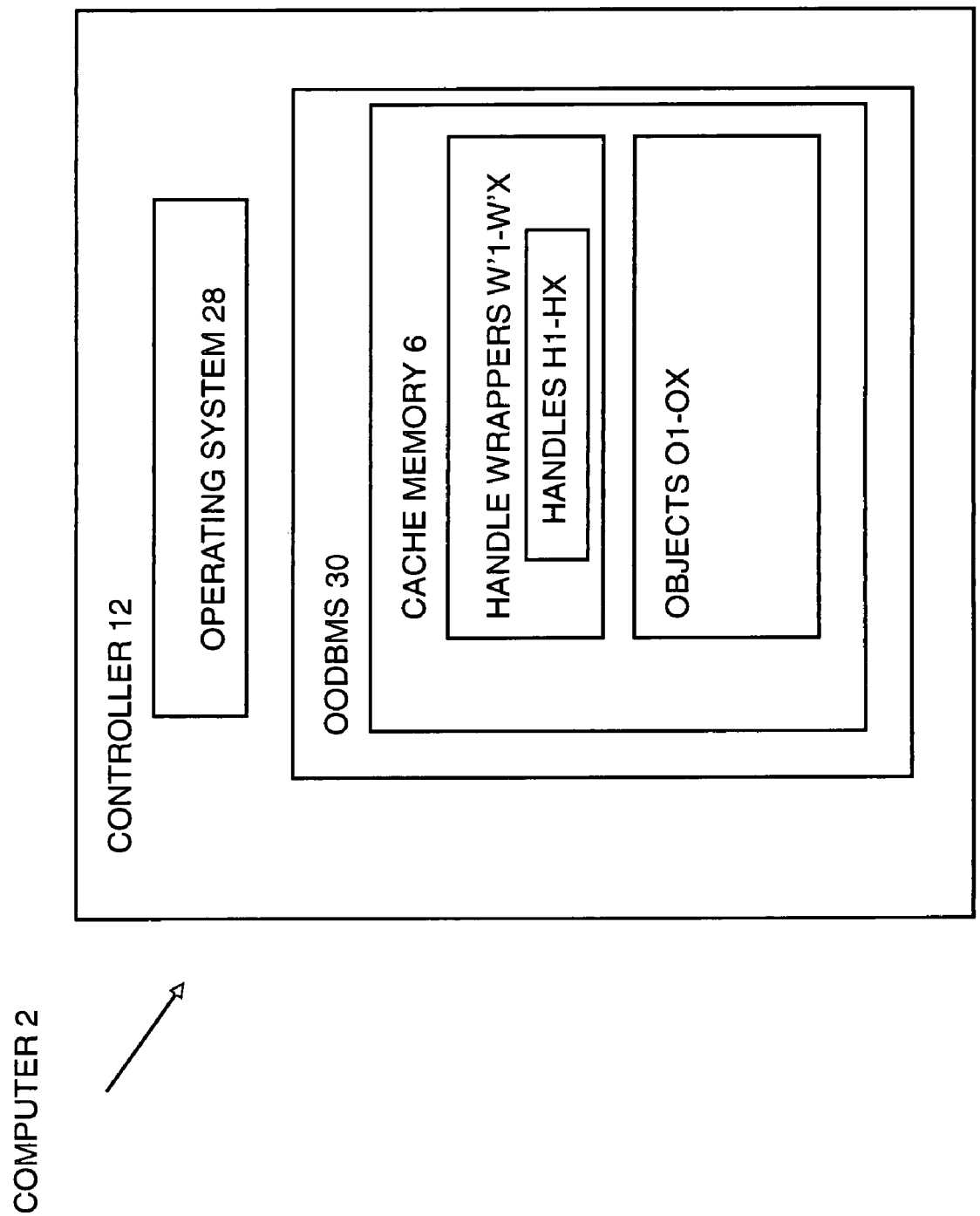
FIG. 10 is an illustration of certain alternate aspects of the computer configured to provide and maintain a plurality of alternate handle wrappers of FIG. 9.
Figure 11:
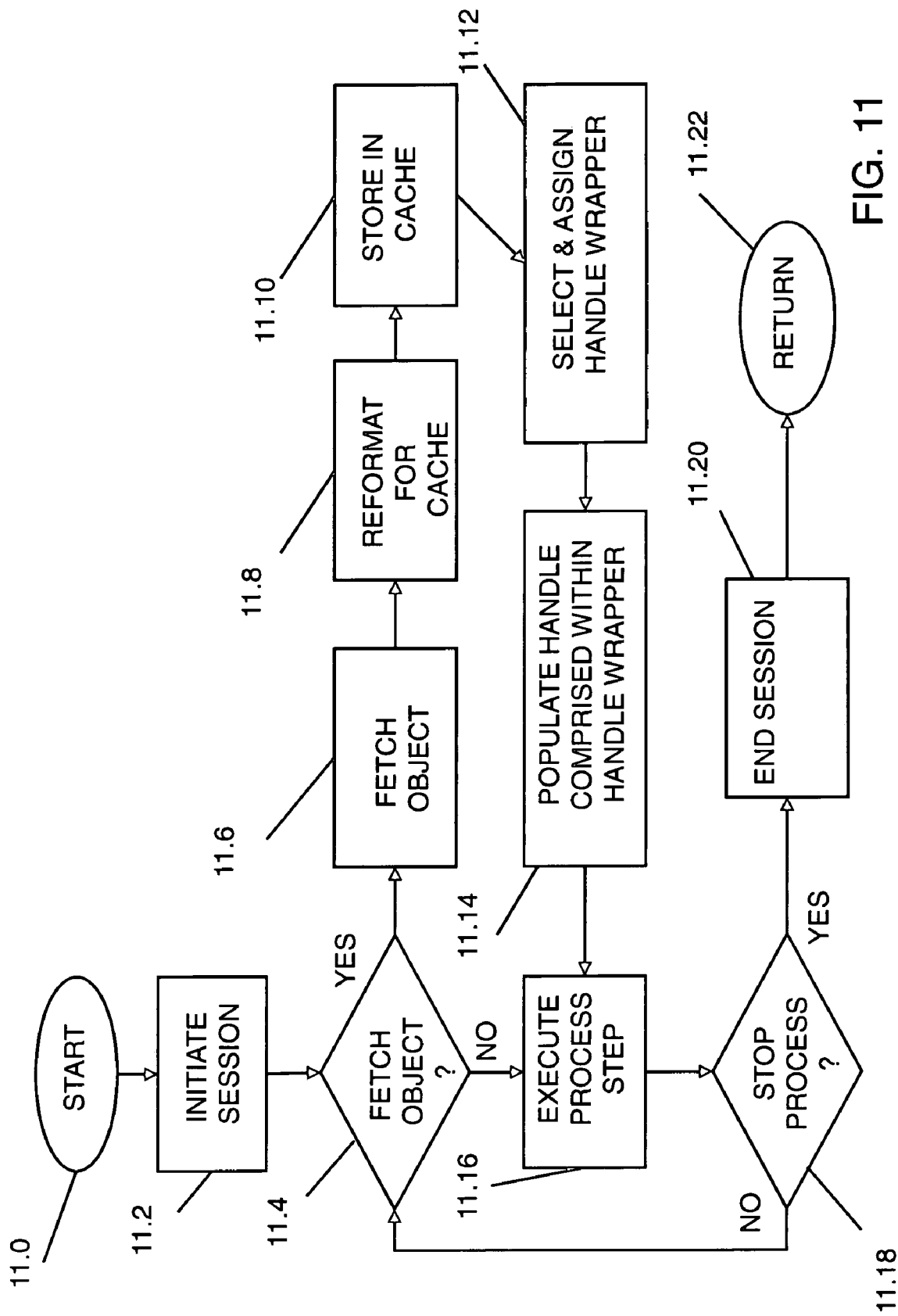
FIG. 11 is a flowchart illustrating the operation of the second method as executed by the computer configured in accordance with FIGS. 9 and 10.

Referring now generally to the Figures and particularly to FIGS. 9 through 11, FIG. 9 is a schematic of a plurality of alternate handle wrappers W'1-W'X that are implemented in accordance with a second alternate preferred embodiment of the method of the present invention, or second method. Each alternate handle wrapper W'1-W'X includes (1.) a unique handle H1-HX stored within an handle data field 9.A, and (2.) an alternate in-use flag F' in an in-use flag data field 9.B and a. Each alternate handle wrapper W'1-W'X includes a single and unique handle H1-HX and each handle wrapper W1-WX is thereby associated in a unique one-to-one correspondence with a single handle H1-HX.

According to the second method, the computer 2 maintains the plurality of handle wrappers W'1-W'X in the cache memory 6. Each alternate handle wrapper W'1-W'X includes a single handle data field 9.A and a single in-use flag data field 9.B. The computer 2 assigns handle wrappers W'1-W'X to individual object handles H1-HX by writing a single unique handle H1-HX into the handle data field 9.A of each alternate handle wrapper W'1-W'X. When a software driven process, e.g. the process initiated in step 2.0, requests a new object instantiation in the cache memory 6, the computer 2 links the new object with an available handle H1-HX contained within an alternate handle wrapper W'1-W'X having an in-use flag F' in the in-use data field 9.B that is set to "not in use". According to the second method, when the instant object becomes unreferenced by the process of step 2.0, the garbage collector second thread operates to call the object finalizer. The finalizer then sets the "in use" flag F' of the alternate handler wrapper W'1-W'X that contains the handle H1-HX pointing to the unreferenced object to "not-in-use". The instant handle H1-HX is thus made available for reassignment to an other object by setting the alternate in use flag of the alternate in-use data field 9.B of the alternate handle wrapper W'1-W'X containing the instant handle H1-HX to "not-in-use".

A negative value, e.g., a NULL value or a ZERO value, of the alternate in-use flag F' of an alternate handle wrapper W'1-W'X may indicate that the handle H1-HX comprised within the instant handle wrapper W'1-W'X is not in use and therefore is available for overwrite or assignment to an object O1-OX, and a positive, e.g., a ONE value of the in-use flag F may indicate that the handle H1-HX comprised within the instant handle wrapper W'1-W'X is in use and therefore is not presently available for overwrite or assignment to an object O1-OX. It is understood that a negative value and a positive value of the in-use flag F and the alternate in-use flag F' may be defined within alternate preferred embodiments of the present invention that is not limited to positive or negative mathematical or logical symbols, but may be indicated by various specified values or symbols.

Referring now generally to the Figures and particularly to FIG. 10, FIG. 10 is an illustration of certain alternate aspects of the computer 2. The controller 12 includes the operating system 28 and the OODBMS 30 configured in accordance with the second method. The OODBMS 30 directs at least part of the cache memory to store, maintain and update the handles H1-HX, alternate handle wrappers W'1-W'X, and objects O1-OX. Each alternate handle wrapper W'1-W'X contains a single unique handle H1-HX. The OODBMS 30 and/or the operating system 28 includes software code that enables the computer 2 to instantiate or execute the process of step 2.0, the garbage collection process, and the finalizer process. The OODBMS 30 and/or the operating system 28 further includes software code that enables the computer 2 to execute one or more of the aspects or steps of the present invention.

Referring now generally to the Figures and particularly to FIG. 11, FIG. 11 is a flowchart illustrating the operation of the second method as executed by the computer 2 of FIG. 1 and the OODBMS 30 of FIG. 10. The first process drives a first thread and a garbage collector process comprises a second thread. The first and second threads are simultaneously managed by the computer 2.

Referring now to the first process, a plurality of handles H1-HX, each handle H1-HX being separately contained within a single unique and alternate handle wrapper W1-WX, are initialized prior to the generation of persistent objects O1-OX. As the first process proceeds, pages of data comprising software objects O1-OX are read from the storage memory 8 and into the cache memory 6. In step 11.6 an object, and optionally a page of software objects O1-OX, is read from the storage memory 8 by the CPU 4. In step 11.8 the object O1-OX selected in step 11.6 is reformatted for storage in the cache memory 6. The reformatted object O1-OX of step 11.8 is then stored in the cache memory 6 in step 11.10. A single alternate handle wrapper W'1-W'X with an alternate handle wrapper flag F' set to "not in-use" is selected and the alternate handle wrapper flag F' is reset to "in-use" in step 11.12. In step 11.14 the handle H1-HX contained within the alternate handle wrapper W'1-W'X selected in step 11.12 is assigned to the individual persistent object O1-OX of the cache memory 6 stored in step 11.10, and the open/closed flag 4.B of the handle H1-HX comprised within the selected alternate handle wrapper W'1-W'X is set to open. In step 11.14, the assigned handle H1-HX is populated with (1.) the OID 4.A of the assigned persistent object, (2.) the open/closed flag 4.B set to open, and (3.) a pointer 4.C identifying the location of the object O1-OX identified in the OID field of the instant handle H1-HX. The open/closed flag 4.B indicates whether the handle H1-HX comprising the instant open/closed flag shall be maintained by the computer 2 for the purposes of completing the process comprising the first thread, and whether the persistent object O1-OX identified by the OID 4.A of the comprising handle H1-HX shall be maintained in the cache memory 6 for the purposes of completing the process comprising the first thread and then updating the identified persistent object O1-OX as the persistent object O1-OX is stored in the storage memory 8. When the handle flag 4.B is changed to closed, the comprising handle H1-HX may be reassigned to another persistent object, the last assigned persistent object O1-OX may be written back into storage memory 8 to update the storage memory 8, and the memory locations dedicated to maintaining the persistent object O1-OX in cache memory 6 may be made available to store other information or other purposes.

A software object O1-OX stored in the cache memory 6 may be written back into the storage memory 8, and erased from the cache memory 6, when that software object O1-OX is unreferenced by the any active application or thread. It is understood that a persistent object O1-OX may be stored within the cache memory 6 as an element of a page of software objects O1-OX or other grouping of information, and that the entire page or grouping of information might not be written back into the storage memory 8 until all elements of a same page or grouping are no longer required to be maintained in the cache memory 6.

According to the second method, and to address the limitations of the prior art, each alternate handle wrapper W'1-W'X is assigned by the computer 2 in a unique, one-to-one correspondence to an individual handle H1-HX, wherein each handle wrapper W'1-W'X contains a single unique handle H1-HX.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

I claim:

1. In an information technology system comprising a processor, a cache memory and an object-oriented database management system ("OODBMS"), the OODBMS comprising an object oriented software data base having a plurality of persistent software objects, the method comprising:
   a. maintaining a plurality of software objects, a plurality of handles, and a plurality of handle wrappers;
   b. initializing a first handle and a first handle wrapper in the cache memory, the first handle wrapper comprising an in-use indicator and a reference to the first handle;
   c. populating the first handle with an object identifier of a first persistent object of the OODBMS and a pointer to the first persistent object;
   d. setting the first handle wrapper in-use indicator to an in-use indication;
   e. simultaneously executing a plurality of threads;
   f. determining that the first persistent object is not referenced by any active OODBMS application;
   g. setting the first handle wrapper in-use indicator to a not-in-use indication, whereby the first handle is made available to be populated with an alternate object and an alternate pointer;
   h. applying a garbage collector thread process to the first persistent object referenced by the first handle when the first persistent object is determined by the processor to be not referenced by any active OODBMS application;
   i. populating the first handle with a second object identifier of a second object and a second pointer to the second object; and
   j. setting the first handle wrapper in-use indicator to an in-use indication, whereby the first handle is made unavailable to be populated by the OODBMS with another object identifier or pointer.

2. The method of claim 1, further comprising applying an object finalizer thread to the first persistent object.

3. The method of claim 1, further comprising populating the first handle wrapper with a first handle pointer, the first handle pointer identifying a memory address of the first handle to the OODBMS.

4. The method of claim 1, wherein the first handle further comprises an object availability indicator.

5. The method of claim 4, further comprising setting the object availability indicator to an open indication, and updating the second persistent object.

6. The method of claim 4, further comprising setting the object availability indicator to a closed indication and thereby inhibiting updating the second persistent object.

7. The method of claim 1, comprising populating the first handle wrapper with a first handle object identifier, wherein the first handle object identifier uniquely identifies the first handle to the OODBMS.

8. The method of claim 1, wherein the first handle wrapper comprises the first handle.

9. An information technology system configured for managing an object oriented data base, the system comprising:
   a. a data base management system ("OODBMS") having an object oriented software data base;
   b. a cache memory, the cache memory bi-directionally accessible to the OODBMS;
   c. a processor, the processor bi-directionally communicatively coupled with the cache memory and bi-directionally accessible to the OODBMS, the processor performing:
      i. maintaining a plurality of software objects, a plurality of handles, and a plurality of handle wrappers;
      ii. initializing a first handle and a first handle wrapper in the cache memory, the first handle wrapper comprising an in-use indicator and a reference to the first handle;
      iii. populating the first handle with an object identifier of a first persistent object of the OODBMS and a pointer to the first persistent object;
      iv. setting the first handle wrapper in-use indicator to an in-use indication;
      v. simultaneously executing a plurality of threads;
      vi. determining that the first persistent object is not referenced by any active OODBMS application;
      vii. setting the first handle wrapper in-use indicator to a not-in-use indication, whereby the first handle is made available to be populated with an alternate object and an alternate pointer;
      viii. applying a garbage collector thread process to the first persistent object referenced by the first handle when the first persistent object is determined by the processor to be not referenced by any active OODBMS application;
      ix. populating the first handle with a second object identifier of a second object and a second pointer to the second object; and
      x. setting the first handle wrapper in-use indicator to a in-use indication, whereby the first handle is made available to be populated with the OODBMS with another object identifier or pointer.

10. The system of claim 9, wherein the OODBMS comprises a plurality of handles and handle wrappers, wherein each handle comprises a reassignable association with a persistent object and each handle wrapper comprises a unique handle of the plurality of software handles.

11. The system of claim 10, further comprising the processor determining when each handle is available for populating with an object identifier and a pointer to a persistent object of the plurality of persistent objects.

12. The system of claim 9, wherein the first handle wrapper comprises the first handle.

13. The system of claim 9, wherein the first handle wrapper comprises a first handle object identifier, the first handle object identifier uniquely identifying the first handle to the OODBMS.

14. The system of claim 9, wherein the first handle wrapper comprises a first handle wrapper pointer, the first handle pointer identifying a memory address of the first handle to the OODBMS.

15. A computer-readable tangible media comprising machine-readable instructions that direct a processor of a computational system having a cache memory and an object-oriented database management system ("OODBMS") to:
   a. maintain a plurality of software objects, handles and handle wrappers;
   b. initialize a first handle and a first handle wrapper in the cache memory, the first handle wrapper comprising an in-use indicator and a reference to the first handle;
   c. populate the first handle with an object identifier of a first persistent object of the OODBMS and a pointer to the first persistent object;
   d. set the first handle wrapper in-use indicator to an in-use indication;

e. simultaneously execute a plurality of threads;

f. determine that the first persistent object is not referenced by any active OODBMS application;

g. set the first handle wrapper in-use indicator to a not-in-use indication, whereby the first handle is made available to be populated with an alternate object and an alternate pointer;

h. apply a garbage collector thread process to the first persistent object referenced by the first handle when the first persistent object is determined by the processor to be not referenced by any active OODBMS application;

i. populate the first handle with a second object identifier of a second object and a second pointer to the second object; and j. set the first handle wrapper in-use indicator to an in-use indication, whereby the first handle is made unavailable to be populated by the OODBMS with another object identifier or pointer.

* * * * *